(No Model.)

F. REIMERS.
REMOVABLE AND ADJUSTABLE WATER PROOF WASH BOWL LINING.

No. 430,195. Patented June 17, 1890.

WITNESSES.

INVENTOR.

UNITED STATES PATENT OFFICE.

FREDRICK REIMERS, OF LINCOLN, NEBRASKA.

REMOVABLE AND ADJUSTABLE WATER-PROOF WASH-BOWL LINING.

SPECIFICATION forming part of Letters Patent No. 430,195, dated June 17, 1890.

Application filed March 12, 1890. Serial No. 343,662. (No model.)

*To all whom it may concern:*

Be it known that I, FREDRICK REIMERS, a citizen of the United States, residing at Lincoln, in the county of Lancaster and State of Nebraska, have invented a Removable and Adjustable Water-Proof Wash-Bowl Lining, of which the following is a full, clear, and exact description, reference being had to the accompanying drawings, making part of this specification, in which—

Figure 1:
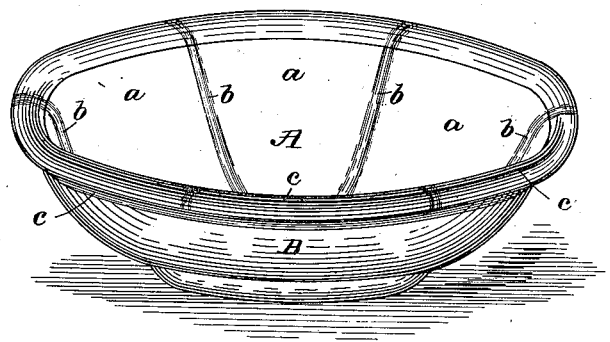
Figure 2:
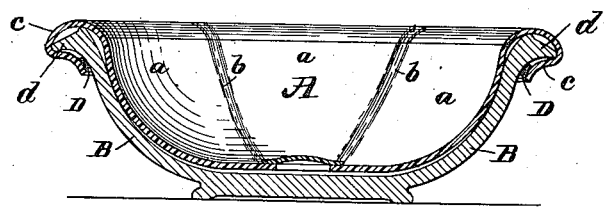
Figure 3:
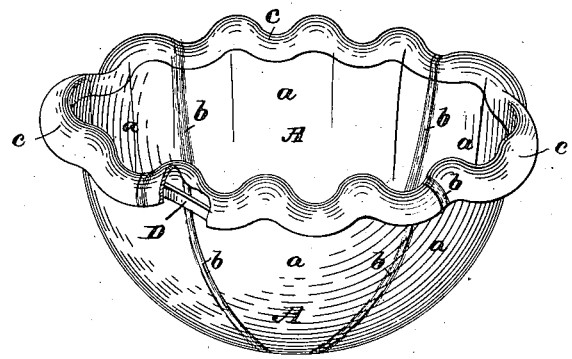

Figure 1 is a perspective view of a washbowl having my improved removable waterproof lining applied thereto. Fig. 2 is a vertical section of the same. Fig. 3 is a perspective view of the lining detached from the bowl.

The indiscriminate use in hotels and other places of the same wash-bowl by large numbers of different persons is frequently the cause of the spread of skin and other diseases of various kinds, and travelers and others often experience much annoyance and discomfort from this cause.

My invention has for its object to prevent the spread of disease in this manner; and it consists in a removable wash-bowl lining composed of flexible water-proof material to enable it to be folded up compactly when not in use, said lining being suitably shaped at its upper edge to fit over the rim of the bowl, where it is held in position by its own elasticity or shape or by a suitable auxiliary device, as hereinafter more particularly set forth.

In the said drawings, A represents my improved wash-bowl lining, which is suitably shaped to fit within an ordinary hand washbowl B, and is preferably composed of vulcanized rubber or rubber cloth, but may be made of any other suitable flexible waterproof material. The said lining may be made in a single piece, or it may be made of any desired number of pieces or sections $a$ united together by cemented water-proof seams $b$, as shown in the drawings.

The upper portion or edge $c$ of the removable lining A is preferably made a little thicker or heavier than the remaining portion or body, and is properly shaped to fit snugly over the rim $d$ of the bowl B, upon which it may be securely held by its own shape or elasticity; but I prefer to employ an elastic band D, which is attached at suitable points to the upper edge or portion $c$ of the lining, so that when the latter is turned over the rim $d$ the band D will be on the inner side of the said portion $c$, and will be drawn by its own elasticity tightly against the outside of the bowl and be concealed from view, as seen in Figs. 1 and 2, the said elastic band being made of such size that it will hold the lining A in place upon bowls of small as well as upon those of large diameter, thus enabling the lining to be adjusted to bowls of different sizes, the edge or portion $c$ extending down more or less upon the outside of the bowl, according to its size.

The above-described detachable lining is adapted to fit any ordinary-sized hand washbowl, and by its use travelers and others may avoid all liability of contracting skin or other contagious d'seases, a person provided with a lining of this description being enabled to practically have his own wash-bowl and feel assured that it is used by no one else, and as it is composed of flexible material it can be folded up compactly, so as to occupy very little space, and be conveniently packed into a valise or carried in the pocket, while it is exceedingly durable and can be afforded at a trifling expense.

What I claim as my invention, and desire to secure by Letters Patent, is—

A removable wash-bowl lining composed of flexible water-proof material shaped to fit the interior of the bowl and extend over the rim of the same, and provided at its upper edge with an elastic band adapted to hold the upper edge of the lining in place upon the rim of the bowl, substantially as described.

Witness my hand this 7th day of March, A. D. 1890.

FREDRICK REIMERS.

In presence of—
J. R. LENIST,
G. L. HORN, Jr.